(12) United States Patent
Kelller-Sornig et al.

(10) Patent No.: US 6,848,259 B2
(45) Date of Patent: Feb. 1, 2005

(54) COMPRESSED AIR ENERGY STORAGE SYSTEM HAVING A STANDBY WARM KEEPING SYSTEM INCLUDING AN ELECTRIC AIR HEATER

(75) Inventors: Peter Kelller-Sornig, Baden (CH); Edoardo Mazza, Buchs (CH); Bozidar Seketa, Wettingen (CH)

(73) Assignee: Alstom Technology LTD, Baden (CH)

( * ) Notice: Subject to any disclaimer, the term of this patent is extended or adjusted under 35 U.S.C. 154(b) by 79 days.

(21) Appl. No.: 10/336,809

(22) Filed: Jan. 6, 2003

(65) Prior Publication Data

US 2003/0177767 A1 Sep. 25, 2003

Related U.S. Application Data

(60) Provisional application No. 60/365,624, filed on Mar. 20, 2002.

(51) Int. Cl.[7] .............................. F02C 1/00; F02G 3/00
(52) U.S. Cl. ..................... 60/727; 60/39.15; 60/39.511
(58) Field of Search ............................... 60/39.15, 791, 60/727, 787, 39.511, 39.183

(56) References Cited

U.S. PATENT DOCUMENTS

| | | | | | |
|---|---|---|---|---|---|
| 3,831,373 A | * | 8/1974 | Flynt | ............................ | 60/802 |
| 3,866,058 A | * | 2/1975 | Lenssen | ....................... | 290/52 |
| 3,935,710 A | * | 2/1976 | Dickinson | ..................... | 60/657 |
| 4,509,957 A | * | 4/1985 | Firey | .............................. | 48/61 |
| 4,522,024 A | * | 6/1985 | Zaugg | .......................... | 60/775 |
| 4,523,432 A | * | 6/1985 | Frutschi | ........................ | 60/659 |
| 4,630,436 A | * | 12/1986 | Frutschi | ................... | 60/39.183 |
| 4,686,822 A | * | 8/1987 | Frutschi | ........................ | 60/772 |
| 4,765,142 A | * | 8/1988 | Nakhamkin | ................... | 60/652 |
| 4,872,307 A | * | 10/1989 | Nakhamkin | ................... | 60/772 |
| 5,363,642 A | * | 11/1994 | Frutschi et al. | ................ | 60/774 |
| 5,379,589 A | * | 1/1995 | Cohn et al. | ................. | 60/39.59 |
| 5,442,905 A | * | 8/1995 | Claeys et al. | ................. | 60/785 |
| 5,495,709 A | * | 3/1996 | Frutschi | ..................... | 60/39.55 |
| 5,778,675 A | * | 7/1998 | Nakhamkin | ................... | 60/652 |
| 5,845,479 A | | 12/1998 | Nakhamkin et al. | | |
| 5,934,063 A | * | 8/1999 | Nakhamkin | ................... | 60/773 |
| 6,276,123 B1 | * | 8/2001 | Chen et al. | ................... | 60/786 |
| 6,694,722 B2 | * | 2/2004 | Kreitmeier | ............... | 60/39.511 |

FOREIGN PATENT DOCUMENTS

| | | |
|---|---|---|
| CH | 659855 | 2/1987 |
| DE | 888335 | 8/1953 |
| DE | 2263102 | 6/1974 |
| DE | 2263051 | 7/1974 |
| DE | 102 35 108 A1 | 3/2003 |
| JP | 08061085 | 3/1996 |

OTHER PUBLICATIONS

John Daly, et al., "Caes—Reduced to Practice", ASME Turbo Expo 2001, Jun. 4–7, 2001, New Orleans, Louisiana, Paper 2001–GT–0397.

* cited by examiner

Primary Examiner—Cheryl J. Tyler
Assistant Examiner—William H. Rodriguez
(74) Attorney, Agent, or Firm—Burns, Doane, Swecker & Mathis, L.L.P.

(57) ABSTRACT

A compressed air energy storage system comprises a cavern (1) for stored compressed air and a system for providing the compressed air to a power train (3, 5), this system including a recuperator (7) and a first valve arrangement (8) that controls the flow of the compressed air from the recuperator and to the power train (3, 5). A system for warm-keeping of the power train (3, 5) during stand-by operation of the compressed air energy storage system comprises the recuperator (2) and/or an auxiliary electrical air heater (11) and a second valve arrangement (10, 13) for controlling the airflow for warm-keeping. The system for warm-keeping of the power train allows improved temperature control and avoids disadvantages associated with a warm-keeping system having a combustor.

6 Claims, 3 Drawing Sheets

COMPRESSED AIR ENERGY STORAGE SYSTEM HAVING A STANDBY WARM KEEPING SYSTEM INCLUDING AN ELECTRIC AIR HEATER

This application claims priority under 35 U.S.C. § 119 to U.S. Provisional Application No. 60/365,624 entitled COMPRESSED AIR ENERGY STORAGE SYSTEM and filed on Mar. 20, 2002, the entire content of which is hereby incorporated by reference.

FIELD OF THE INVENTION

This invention pertains to a compressed air energy storage (CAES) system and to a system for warm-keeping of the power train of the CAES system, in particular of the rotor of the power train during stand-by operation.

BACKGROUND OF THE INVENTION

CAES systems store energy by means of compressed air in a cavern during off-peak periods. Electrical energy is produced on peak by admitting compressed air from the cavern to one or several turbines. The power train comprises at least one combustion chamber heating the compressed air to an appropriate temperature. To cover energy demands on peak a CAES unit might be started several times per week. To meet load demands, fast start-up capability of the power train is mandatory in order to meet requirements on the power supply market. However, fast load ramps during start-up impose thermal stresses on the power train by thermal transients. This can have an impact on the power train's life time in that life time consumption increases with increasing thermal transients.

During stand-by, the power train is subject to heat losses and temperature equilibration in the components by heat conduction. An in-flow of cold air through the rotor seals contributes significantly to the heat loss. The longer the stand-by time, the lower component temperatures fall and the larger the thermal stresses become during start-up.

At a commercial CAES power plant in Huntdorf, Germany, the power train consists of two gas turbines with a high and low pressure combustion chamber. The turbines are arranged on a single shaft.

During stand-by, no measures are activated to keep the power train at an elevated temperature. Nevertheless, the power plant is able to start up very fast. This is due to low gas turbine inlet temperatures at full load, which allows an uncooled turbine design and reduces the average thermal transients between start-up and full load and the impact on the rotor's lifetime. However, in view of achieving higher gas turbine efficiencies, this concept of low gas turbine inlet temperatures is no longer suitable.

A further commercial CAES power plant installed in McIntosh, Ala. is similar to the plant in Huntdorf. Its power train comprises a high and intermediate pressure turbine where a combustion chamber is installed upstream of each turbine.

The power train is equipped with a stand-by combustor that is arranged upstream of the high pressure turbine and described in Proceedings of ASME Turbo EXPO 2001, paper 2001-GT-0397. For the purpose of warm-keeping, the stand-by combustor is operated in a continuous or intermittent mode depending on the high pressure casing temperature. Thereby, a minimum temperature of the casings, rotor, stationary and rotating blades, and other components is maintained during stand-by operation and thermal stresses are reduced during start-up.

The stand-by burner is suitable for the prevention of an undesirable power train cool-down. However, the operation of a stand-by combustor for this purpose bears some disadvantages as follows:

Prior to igniting the burner, the system must be purged to fulfill safety requirements. This will consume valuable cavern air.

If purge air cannot be preheated, the purge sequence will remove heat from the turbine. This counteracts the purpose of warm-keeping.

The burner requires a fuel distribution system, which must be considered in the plant's safety concept.

Temperature control is difficult. Direct measurement of flame temperatures is impossible due to high temperatures during burner operation.

The burner emissions can influence the plant's operating permits.

A basic layout of a CAES power plant is shown in FIG. 1. The plant comprises a cavern 1 for storing compressed air. A recuperator 2 preheats air from the cavern 1 before it is admitted to an air turbine 3. The air turbine 3 discharges into the combustion chamber 4, where the air is reheated. The reheated air expands further in the low-pressure turbine 5. Augmented firing in an auxiliary burner 6 can be used to increase the temperature of the exhaust gas before it enters the recuperator 2 on the flue gas side. Following heat transfer to the cold air from the cavern 1, the flue gas leaves the system through the stack 7. The airflow to the recuperator 2 and to the air turbine 3 is controlled by valve arrangements 8 and 9 respectively.

SUMMARY OF THE INVENTION

It is the object of the invention to provide a system for warm-keeping of the power train of a CAES system during stand-by operation, which reduces the thermal stresses of the power train. In particular, the system for warm-keeping shall avoid the disadvantages encountered in the systems described in the background art. That is, the disadvantages involved with the use of a stand-by combustor and the associated necessary purging shall be avoided or reduced, and the system shall allow an improved temperature control of the medium providing the warm-keeping of the power train. Furthermore, the system for warm-keeping shall enable a turbine start-up at initial material temperatures that are higher than in the described state of the art. Furthermore, the thermal stresses on the rotor during start-up shall be reduced compared to the state of the art. All in all, the system for warm-keeping shall allow decreased start-up times and increased component life time.

This invention disclosure presents a new approach to the warm-keeping during stand-by operation of the power train of a CAES system. Such CAES system comprises a storage cavern for compressed air, a power train including a rotor and one or several expansion turbines, and a system that provides the power train with the compressed air from the cavern where this system includes a recuperator for preheating said compressed air and a first valve arrangement that controls the preheated airflow from the recuperator to the power train.

According to the invention, the CAES system comprises a warm-keeping system that includes the recuperator and/or an auxiliary electrical air heater. An airflow is led to the auxiliary electrical air heater, preheated by the air heater, and led to the power train for its warm-keeping. The system includes furthermore a second valve arrangement that is arranged to control either the airflow to the electrical air heater or arranged to control the airflow away from the electrical air heater and to the power train. The system serves to preheat the airflow for the purpose of warm-keeping of the power train above a minimum temperature during stand-by operation.

During stand-by operation of the CAES system, the warm-keeping system receives air from the cavern or from another source and warms it to a predetermined temperature either by means of heat transfer in the recuperator and by means of additional heating in the auxiliary electrical air heater, or only by means of heating in the auxiliary air heater. The airflow to the warm-keeping system and to the expansion turbines is controlled by means of the first and second valve arrangements.

The recuperator and/or auxiliary electrical air heater of this warm-keeping system can be activated at any time. The various measures necessary in connection with the operation of a stand-by combustor such as purging using cavern air, operation of a fuel distribution and combustor system and the associated maintainance of a safety concept and control of emissions from the burner are no longer an issue. Instead, the safety concept of the plant is simplified since no additional fuel distribution system and burner operation is necessary. Furthermore, the temperature control of the warm-keeping system is realized in a straightforward manner by means of a modulation of the electrical heater power to the electrical air heater.

Various arrangements of the warm-keeping system according to the invention are described as follows in connection with the figures.

DETAILED DESCRIPTION OF THE INVENTION

Figure 1:
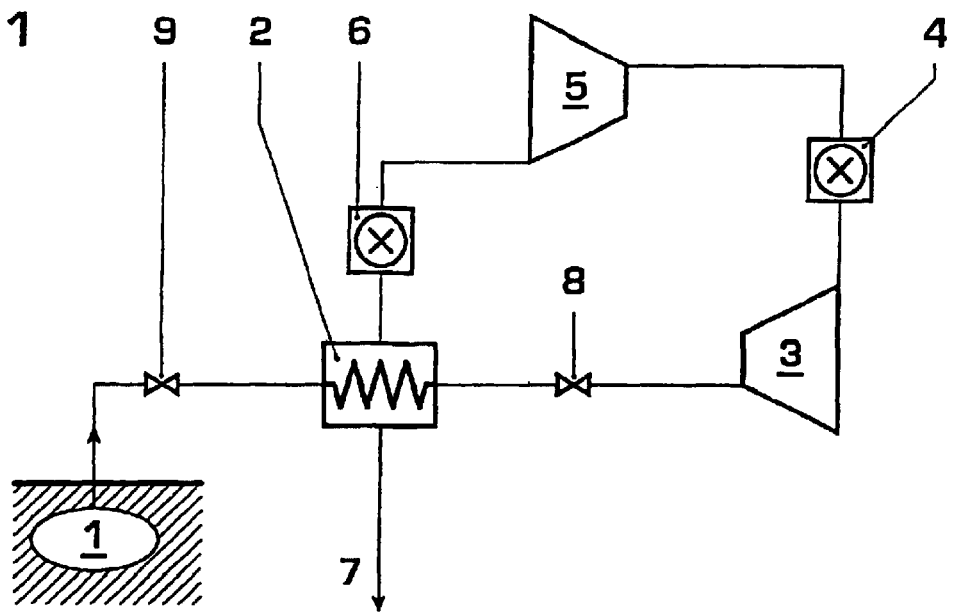
FIG. 1 shows a basic layout of a compressed air energy storage system.

Several preferred solutions for a system for warm-keeping during stand-by operation of the power train of a CAES system of the type shown in FIG. 1 are herewith described.

Figure 2:
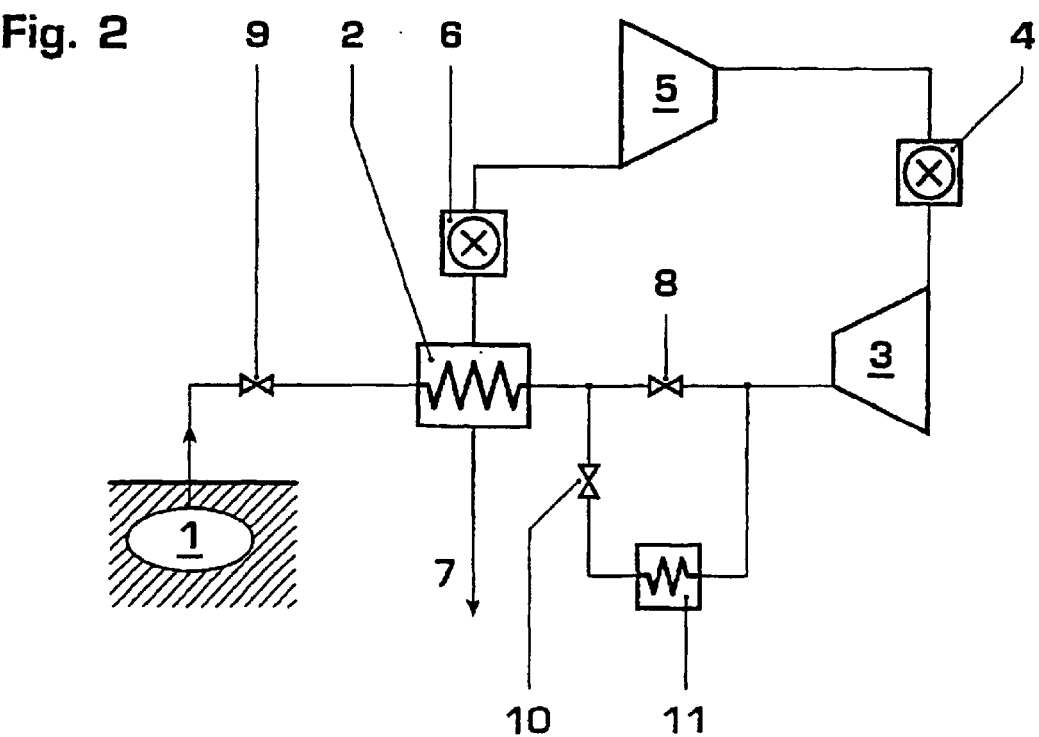
FIG. 2 shows a first variant of the warm-keeping system according to the invention and applied to a system according to the layout of FIG. 1.

According to a first variant of the invention as shown in FIG. 2, a small airflow is extracted from the cavern 1 during stand-by operation and preheated in the recuperator 2. Like the power train, the recuperator is subject to heat losses. Therefore, the hot air temperature might not be sufficient to achieve enough heating of the power train during start-up. The recuperator is subject to heat losses in same manner as is the power train. For the case that heating of air for warm-keeping of the power train by means of the recuperator is not sufficient, an auxiliary electrical heater 11 is installed in order to provide additional air heating. The auxiliary electrical air heater 11 is installed such that it bypasses a valve arrangement 8 that controls the admission of preheated air to the air expansion turbine 3. Temperature control can be easily accomplished by controlling the heater power of the auxiliary electrical heater 11. The airflow through the auxiliary air heater is controlled by a valve arrangement 10 while the valve 8 will be closed.

Figure 3:
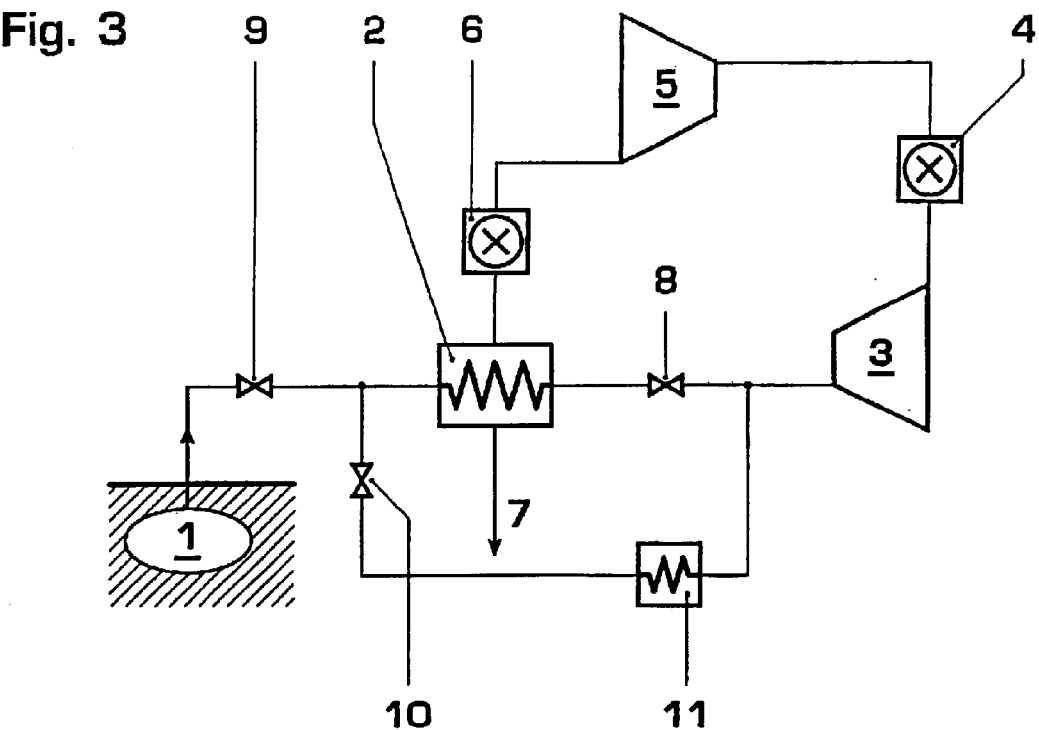
FIG. 3 shows a second variant of the warm-keeping system.

A second variant of the invention is shown in FIG. 3 and is similar to the first variant. Here the air is directed from the storage cavern 1 to the auxiliary electric air heater 11 while the airflow is controlled by means of the second valve arrangement 10. The valve arrangement 10 and the auxiliary electrical heater 11 bypass both the recuperator 2 and the first valve arrangement 8. A temperature increase of the air is accomplished in the electrical air heater 11 only. The advantage of this solution compared to variant 1 is a simplified heater design since the heater 11 need not sustain high inlet temperatures. Additionally, the warm-keeping system can be operated independently of the hot air temperatures in the recuperator. These advantages are achieved at the expense of higher heating power required for the heater. As in variant 1, the temperature control is straightforward.

Figure 4:
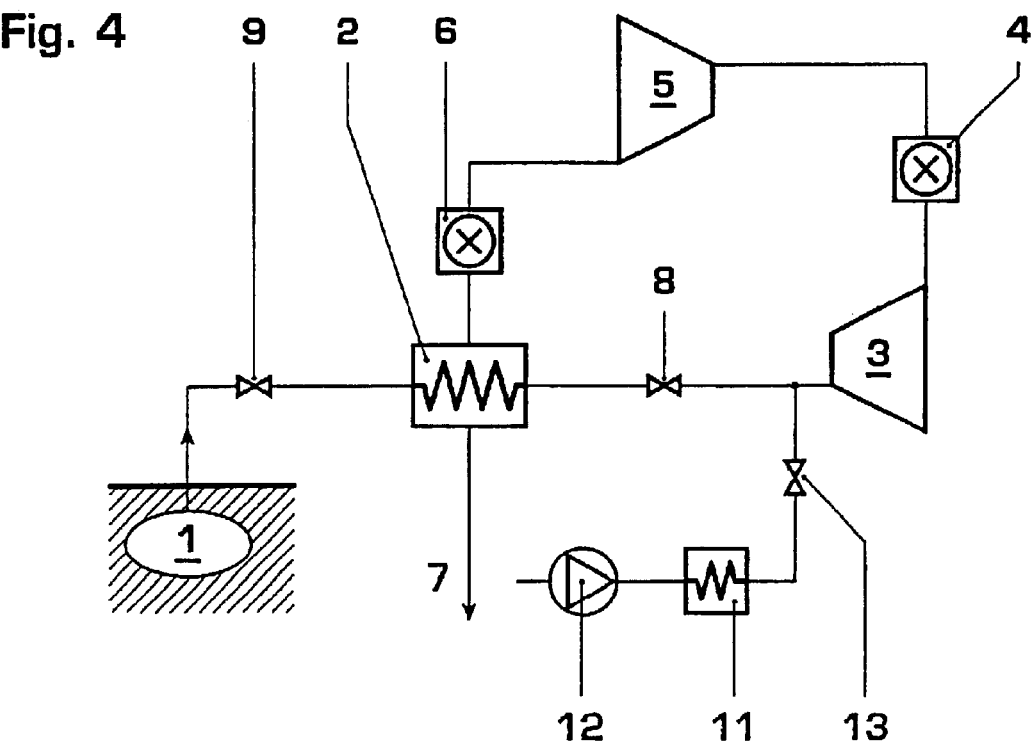
FIG. 4 shows a third variant of the warm-keeping system.

In a third variant of the invention as shown in FIG. 4 air for the warm-keeping of the rotor is delivered by means of an additional auxiliary fan 12. This solution has the additional advantage that it saves cavern air and circumvents large throttling losses from the cavern to the turbine inlet. During normal turbine operation, the flow path from the electrical heater to the turbine is closed by the valve arrangement 13.

Figure 5:
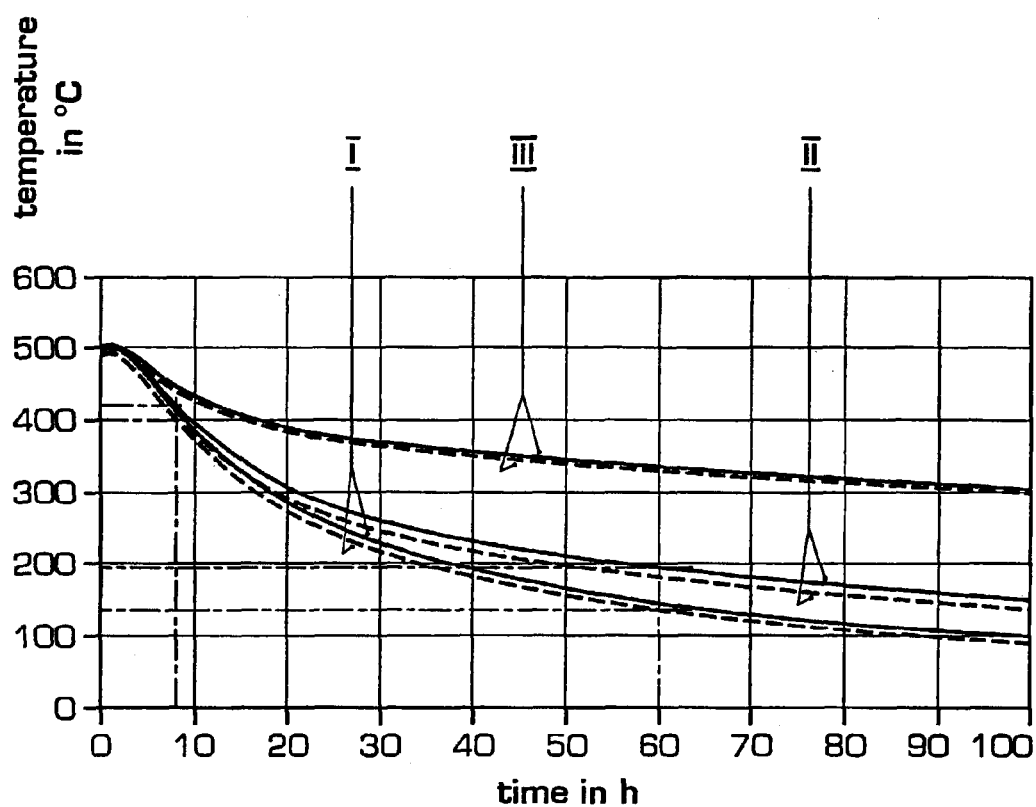
FIG. 5 shows a diagram disclosing calculated temperatures at two selected points on the rotor that is cooling down during stand-by operation.

An in-flow of cold ambient air through the gland seals, which seal the rotor to the outside, can have significant impact on the heat loss. An example for calculated heat losses and resultant cool down temperatures following the shut down of the power train at different rotor locations and for different leakage airflows is shown in FIG. 5. It reveals the development of temperatures as a function of time at two selected points at the surface in the hot region of the rotor. The continuous curves correspond to the temperatures of the first selected point, and the broken curves correspond to the temperatures of the second selected point on the rotor. During stand-by operation of the turbine, cold ambient air enters through the gland seals, and the temperatures at the two points drop according to the three pairs of curves I, II and III for various situations with or without heat-flow. The pair of curves I show the cool-down of the rotor as a function of stand-by time with a high estimated leakage heat flow through the gland seals and hence fastest cooling rate compared to the pairs of curves II or III. The pair of curves II show in comparison the cool-down of the rotor with a low estimated leakage heat flow. Finally, the pair of curves III show the cool-down of the rotor with only cooling through the bearing and no leakage heat flow through the gland seals and hence the slowest cooling rate.

The curves show that the cool-down rate can be slowed down significantly if the amount of leakage heat flow is reduced by the introduction of a heat flow in the vicinity of the seals and/or the prevention of cold ambient air entering through the seals.

In a typical air expansion turbine gland seals consisting of several seal rings are arranged in order to seal a space of high pressure to the outside environment and to prevent leakage flows to the outside. They are arranged for example at the low-pressure end of the turbine.

During stand-by operation these gland seals serve to avoid the inflow of cold air from the environment into the turbine. An inflow of warm air at the the locations of the gland seals serves not only the purpose of keeping the rotor warm but also to provide a kind of curtain of warm air that prevents cold air from entering the turbine. The air must still be preheated for this purpose, e.g. by any of the previously described arrangements. When the preheated air enters at the seal, it will flow to one part into the turbine enclosure and to another part into the environment preventing cold ambient air from entering the turbine.

In a preferred variant of the invention, the preheated air is directed to the rotor at the locations of the gland seals and in particular between the individual seal rings of the gland seals.

Alternatively, the warm air can be directed to a location in the immediate vicinity of the gland.

The warm-keeping systems as described in this disclosure are not exhaustive. The warm-keeping system can also, for example, extract air from a turbine. The turbine bypass can also bypass the recuperator. The chosen location of air extraction depends on the optimum balance of plant arrangement planning for each individual CAES power plant.

What is claimed is:

1. A compressed air energy storage system, comprising:

a cavern for storing compressed air, a power train comprising a rotor and one or several expansion turbines, and a system providing the power train with the compressed air from the cavern that includes a recuperator for preheating the compressed air and a first valve arrangement, that controls the flow of preheated air from the recuperator to the power train, and the compressed air energy storage system further comprising a system for warm-keeping of the power train during stand-by operation of the compressed air energy storage system wherein the system for warm-keeping includes the recuperator and/or an auxiliary electrical air heater, an airflow being directed to the warm-keeping system for preheating and the thus preheated airflow being directed away from the system for warm-keeping and to the power train, and the system for warm-keeping furthermore includes an additional, second valve arrangement that controls either said airflow to the system for warm-keeping or said airflow away from said system for warm-keeping and to the power train, wherein the auxiliary electrical air heater and the second valve arrangement are positioned such that they bypass the first valve arrangement that controls the admission of compressed air to the power train.

2. A compressed air energy storage system, comprising:

a cavern for storing compressed air, a power train comprising a rotor and one or several expansion turbines, and a system providing the power train with the compressed air from the cavern that includes a recuperator for preheating the compressed air and a first valve arrangement, that controls the flow of preheated air from the recuperator to the power train, and the compressed air energy storage system further comprising a system for warm-keeping of the power train during stand-by operation of the compressed air energy storage system wherein the system for warm-keeping includes the recuperator and/or an auxiliary electrical air heater, an airflow being directed to the warm-keeping system for preheating and the thus preheated airflow being directed away from the system for warm-keeping and to the power train, and the system for warm-keeping furthermore includes an additional, second valve arrangement that controls either said airflow to the system for warm-keeping or said airflow away from said system for warm-keeping and to the power train, wherein the auxiliary electrical air heater is arranged such that it bypasses both the recuperator and the first valve arrangement that controls the admission of compressed air to the power train, and the second valve arrangement is arranged prior to the auxiliary electrical air heater.

3. A compressed air energy storage system, comprising:

a cavern for storing compressed air, a power train comprising a rotor and one or several expansion turbines, and a system providing the power train with the compressed air from the cavern that includes a recuperator for preheating the compressed air and a first valve arrangement, that controls the flow of preheated air from the recuperator to the power train, and the compressed air energy storage system further comprising a system for warm-keeping of the power train during stand-by operation of the compressed air energy storage system wherein the system for warm-keeping includes the recuperator and/or an auxiliary electrical air heater, an airflow being directed to the warm-keeping system for preheating and the thus preheated airflow being directed away from the system for warm-keeping and to the power train, and the system for warm-keeping furthermore includes an additional, second valve arrangement that controls either said airflow to the system for warm-keeping or said airflow away from said system for warm-keeping and to the power train, wherein an auxiliary fan is arranged prior to the auxiliary electrical air heater providing the auxiliary electrical air heater with an airflow to be preheated and the second valve arrangement is positioned to control the flow of preheated air away from the auxiliary electrical air heater and to the power train.

4. The compressed air energy storage system according to claim 1, wherein the airflow away from the system for warm-keeping is directed to gland seals on the rotor of the power train or to locations in the vicinity of the gland seals.

5. The compressed air energy storage system according to claim 2, wherein the airflow away from the system for warm-keeping is directed to gland seals on the rotor of the power train or to locations in the vicinity of the gland seals.

6. The compressed air energy storage system according to claim 3, wherein the airflow away from the system for warm-keeping is directed to gland seals on the rotor of the power train or to locations in the vicinity of the gland seals.

* * * * *